United States Patent [19]

Massie

[11] Patent Number: 5,455,501
[45] Date of Patent: Oct. 3, 1995

[54] MULTIPLE OUTPUT DC-DC CONVERTER WITH DIFFERENT RANGES OF OUTPUT ASSURANCE AND CAPABLE OF TOLERATING LOAD TRANSIENTS

[75] Inventor: Harold L. Massie, Linn, Oreg.

[73] Assignee: Intel Corporation, Santa Clara, Calif.

[21] Appl. No.: 217,643

[22] Filed: Mar. 24, 1994

[51] Int. Cl.⁶ .................................................. G05F 1/577
[52] U.S. Cl. .......................... 323/267; 323/271; 323/284; 307/44
[58] Field of Search ...................... 323/266, 267, 323/268, 271, 282, 284; 307/44, 45

[56] References Cited

U.S. PATENT DOCUMENTS

| | | | |
|---|---|---|---|
| 4,945,465 | 7/1990 | Marinus et al. | 323/267 |
| 5,119,013 | 6/1992 | Sabroff | 323/267 |

Primary Examiner—Peter S. Wong
Assistant Examiner—Y. Jessica Han
Attorney, Agent, or Firm—Blakely, Sokoloff, Taylor & Zafman

[57] ABSTRACT

A primary voltage generation circuitry and an auxiliary voltage generation circuitry is provided to a DC-DC converter. The primary voltage generation circuitry generates a primary voltage output, and the auxiliary voltage generation circuitry, in cooperation with the primary voltage generation circuitry, generates an auxiliary voltage output. The primary voltage generation circuitry includes a switching circuit element and an inductor element, whereas the auxiliary voltage generation circuitry includes an inductor element complementary to the inductor element of the primary voltage generation circuitry. The inductor element of the auxiliary voltage generation circuitry references the primary voltage output, and relies on a minimum load at the primary voltage output. Preferably, the auxiliary voltage generation circuitry further includes reference circuitry elements for regulating the auxiliary voltage output to a precise assurance range. As a result, multiple high precision voltage outputs are generated efficiently by the DC-DC converter in a cost effective manner.

7 Claims, 3 Drawing Sheets

MULTIPLE OUTPUT DC-DC CONVERTER WITH DIFFERENT RANGES OF OUTPUT ASSURANCE AND CAPABLE OF TOLERATING LOAD TRANSIENTS

BACKGROUND OF THE INVENTION

1. Field of the Invention

The present invention relates to the fields of electronics and computer systems. More specifically, the present invention relates to DC-DC converters having specific applications in computer systems.

2. Background Information

The power supplies in a computer system are designed to meet the specific power requirements of the integrated circuit chips (ICs) that are the components of the system. The nominal operating voltages for the ICs are typically known because most ICs are manufactured to meet industry standards for device operation. For example, the nominal supply voltage for transistor-transistor logic (TTL) devices is 5.0 volts while the nominal supply voltage for complementary metal oxide semiconductor (CMOS) devices is 3.3 volts. Ideally, a power supply will deliver the nominal voltage levels with perfect assurance and precision, but power supplies are typically inaccurate due to a number of factors. A typical range of assurance for a power supply is plus or minus five percent. Thus, most ICs are further designed to operate within a range of plus or minus five percent of the nominal voltage.

However, some ICs are less tolerant of power supply inaccuracies, requiring ranges of assurance that are a lot more precise than what are offered by typical off the shelf power supplies, whereas, other ICs may require nominal operating voltages other than the standard TTL and CMOS voltages supported by the off the shelf power supplies. The operating voltage of an IC having either one or both of these characteristics can be supplied by a DC-DC converter that converts a DC output of the power supply into the desired DC operating voltage and/or the desired range of assurance, such as the DC-DC converter disclosed in copending U.S. patent application Ser. No. 08/184,387, filed Jan. 24, 1994, entitled A High Performance DC-DC Converter.

As discussed in the copending application, three critical considerations in designing DC-DC converters for computer systems are efficiency, load transients, and cost. It is inefficient and costly to provide a DC-DC converter to meet each of the different range accuracy and/or nominal operating voltage requirements of the various IC components of a computer system.

Thus, it is desirable to provide a DC-DC converter that can output multiple nominal operating voltages with different ranges of assurance. It is further desirable that the DC-DC converter can accommodate load transients in one or more of its outputs. As will be disclosed in more detail below, the multiple output DC-DC converter of the present invention advantageously achieves these and other desirable results.

SUMMARY OF THE INVENTION

The desired results are advantageously achieved by providing a primary voltage generation circuitry and an auxiliary voltage generation circuitry to a DC-DC converter. The primary voltage generation circuitry generates a primary voltage output, and the auxiliary voltage generation circuitry, in cooperation with the primary voltage generation circuitry, generates an auxiliary voltage output. The primary voltage generation circuitry includes a switching circuit element and an inductor element, whereas the auxiliary voltage generation circuitry includes an inductor element complementary to the inductor element of the primary voltage generation circuitry. The inductor element of the auxiliary voltage generation circuitry references the primary voltage output, and relies on a minimum load at the primary voltage output. Preferably, the auxiliary voltage generation circuitry further includes reference circuitry elements for regulating the auxiliary voltage output to a precise assurance range.

In an alternate embodiment, the inductor element of the auxiliary voltage generation circuitry references an independent reference voltage instead of the primary voltage output. Furthermore, the primary voltage generation circuitry is provided with a loading circuitry for removing the minimum load requirement at the primary voltage output. The loading circuitry includes another switching element complementary to the above mentioned switching element of the primary voltage generation circuitry.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
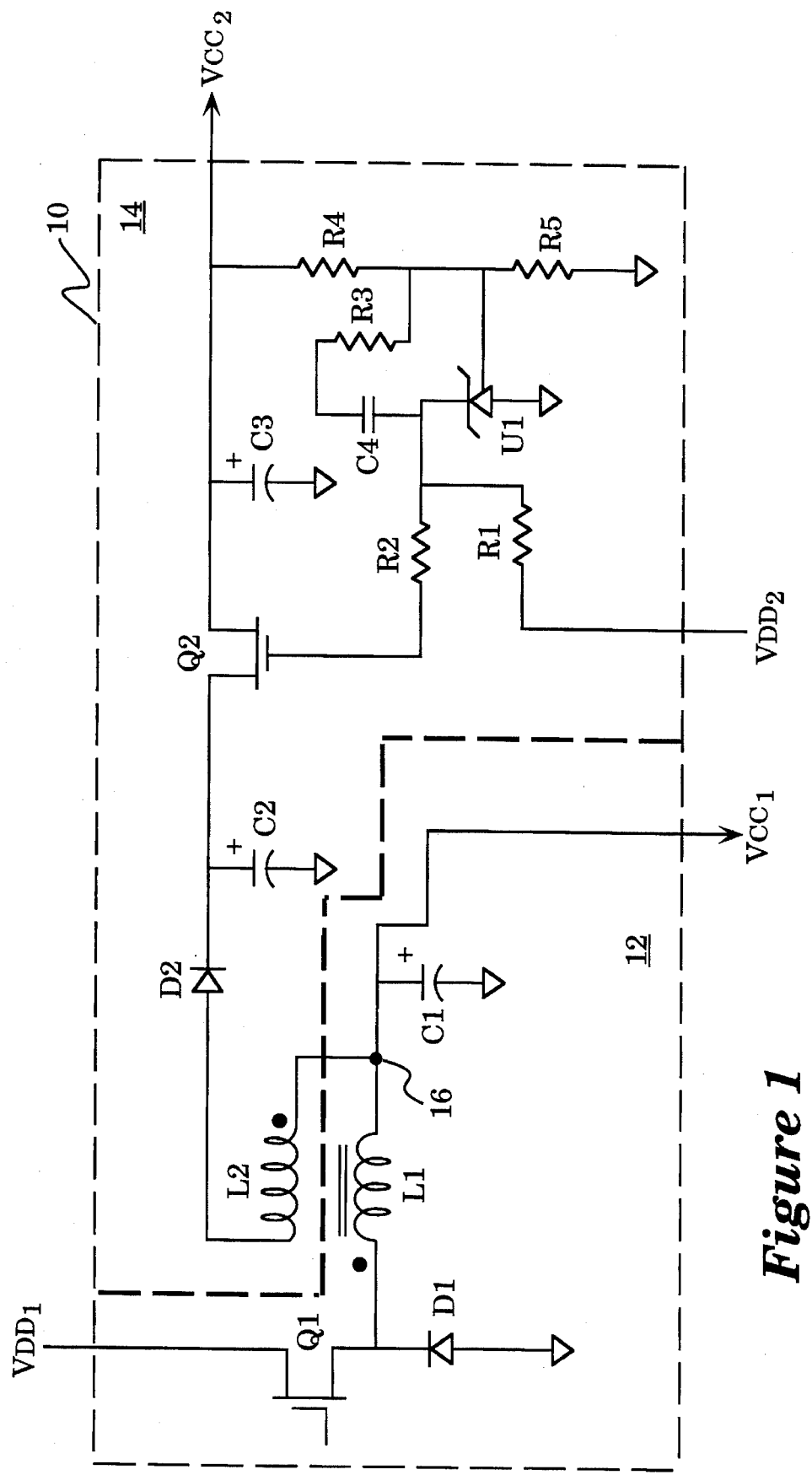
FIG. 1 illustrates the relevant portions of one embodiment of the multiple output DC-DC converter of the present invention.

Referring now to FIG. 1, a diagram illustrating the relevant portions of the first embodiment of the multiple output DC-DC converter of the present invention is shown. As illustrated, the multiple output DC-DC converter 10 comprises primary voltage generation circuitry 12 for generating a primary voltage output $Vcc_1$, and auxiliary voltage generation circuitry 14 for generating an auxiliary voltage output $Vcc_2$. The two voltage generation circuitry 12 and 14 are coupled to each other at node 16, and cooperate with each other through their inductor windings L1 and L2, which will be described in more detail below.

The primary voltage generation circuitry 12 receives a primary voltage $Vdd_1$ as input, and uses $Vdd_1$ to generate the primary voltage output $Vcc_1$. The auxiliary voltage generation circuitry 14 receives a first input voltage at node 16, and uses the first input voltage to generate the auxiliary voltage output $Vcc_2$. The auxiliary voltage generation circuitry 14 also receives a second voltage $Vdd_2$ as input, and uses $Vdd_2$ to regulate $Vcc_2$.

In one embodiment, $Vdd_1$ is 5.0 volts; and $Vcc_1$ and $Vcc_2$ are 3.3 volts and 5.1 volts respectively. The voltage at node 16 and $Vdd_2$ are 3.3 volts and 12 volts respectively. $Vcc_2$ is regulated to a precision of plus or minus 2%.

The key elements of the primary voltage generation circuitry 12 include a switching field effect transistor (FET) Q1, an inductor winding L1, a capacitor C1, and a diode D1, coupled to each other as shown. The inductor winding L1 in cooperation with capacitor C1 together filter the digital pulses at the source of Q1 to generate $Vcc_1$. D1 is used to clamp the voltage at the source of Q1, when Q1 is in a low state. The primary voltage generation circuitry 12 is intended to represent a broad category of circuitry found in traditional single output DC-DC converters, including but not limited to the DC-DC converter disclosed in the above identified copending U.S. Patent Application, which is hereby fully incorporated by reference.

The auxiliary voltage generation circuitry 14 comprises an inductor winding L2, a series pass FET Q2, and a precision reference U1. Additionally, the auxiliary voltage generation circuitry 14 comprises a diode D2, capacitors C2–C4, and resistors R1–R5. The circuit elements are coupled to each other as shown. The digital pulses from Q1 are coupled from L1 to L2 during the low state of Q1, which occurs when Q1 is off. In other words, the voltage at node 16 is provided to the anode of D2 when Q1 is off. As illustrated, L2 references $Vcc_1$. As a result, the pulses to D2 are offset by $Vcc_1$. Additionally, the winding ratio of L2 and L1 is set in a manner such that adequate rectified and filtered DC voltage input is provided to Q2, which is a small differential greater than the desired auxiliary voltage output $Vcc_2$, thereby minimizing power loss in Q2. Q2 in turn, in cooperation with C3, generates and outputs $Vcc_2$. U1 in cooperation with the resistors R1–R5 and capacitor C4 receives $Vdd_2$ as input, and uses $Vdd_2$ to provide gate voltage to Q2. U1 controls this gate voltage by comparing an internal reference to the voltage at the junction of R4 and R5 to regulate $Vcc_2$. To achieve the desired high precision for $Vcc_2$, it will be appreciated that high precision circuit elements have to be used for U1 and the resistors, in particular R4 and R5.

As will be appreciated, for this embodiment, since L2 references $Vcc_1$ through direct coupling to the primary voltage generation circuitry 12, L2 also relies on a minimum load being maintained on $Vcc_1$.

In the above described 3.3 v and 5 v embodiment, the low state of Q1 is at –0.4 v. The pulses to D2 are offset by +3.3 v. The input voltage to Q2 is set to 0.5 v–2.0 v greater than the 5.1 v. Lastly, $Vdd_2$ is set to 12 v, and the minimum load on $Vcc_1$ is about 0.1 amp.

Figure 2:
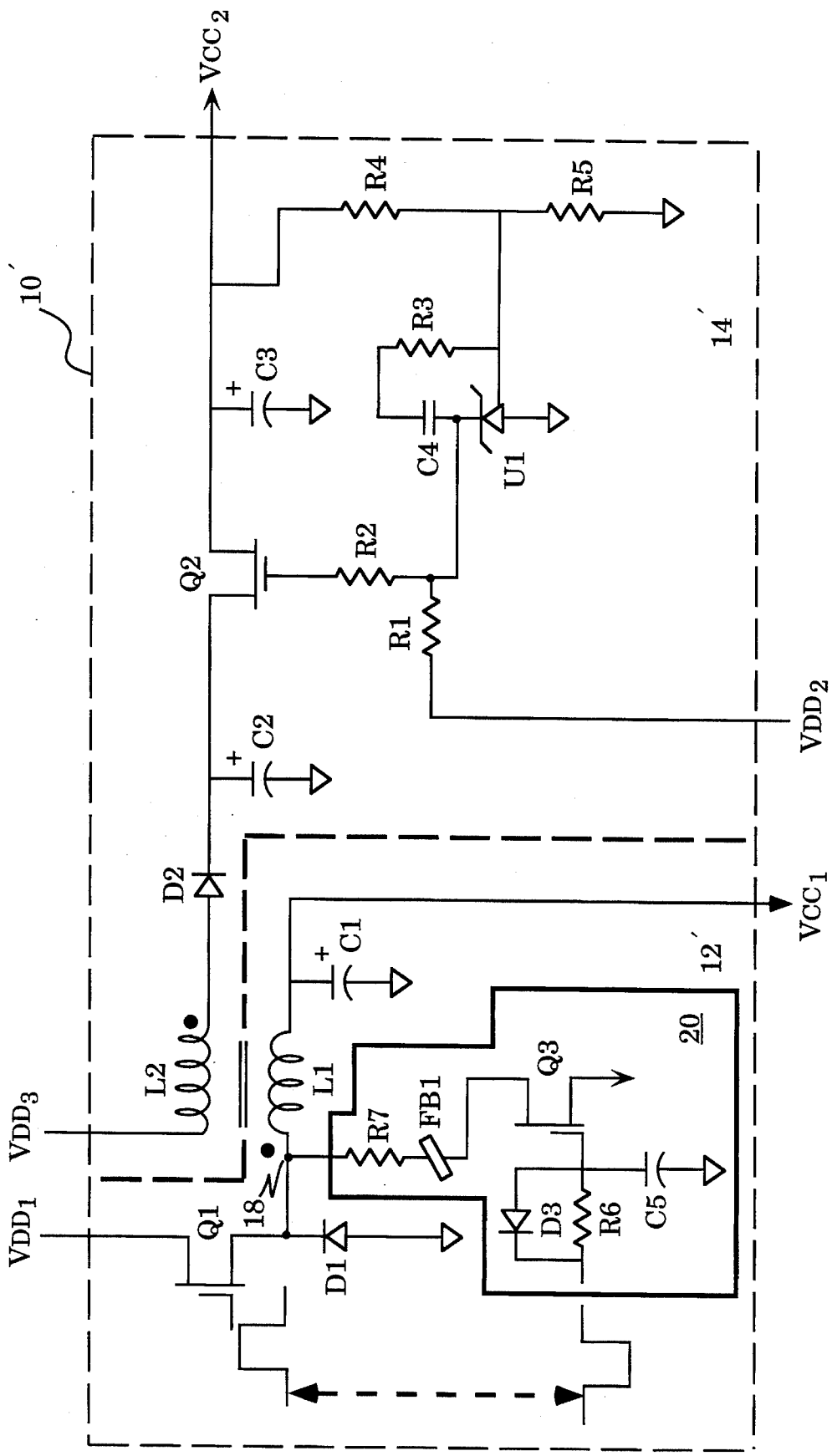
FIG. 2 illustrates the relevant portions of an alternate embodiment of the multiple output DC-DC converter of the present invention.

Referring now to FIG. 2, a block diagram illustrating the relevant portions of an alternate embodiment of the multiple output DC-DC converter of the present invention is shown. Similar to the above described embodiment, the multiple output DC-DC converter 10' comprises primary voltage generation circuitry 12' for generating $Vcc_1$ and auxiliary voltage generation circuitry 14' for generating $Vcc_2$. The two voltage generation circuitry 12' and 14' are not coupled to each other, except they still cooperate with each other through their complementary inductor windings L1 and L2.

Also similar to the above described embodiment, the primary voltage generation circuitry 12' receives a primary voltage $Vdd_1$ as input, and uses $Vdd_1$ to generate the primary voltage output $Vcc_1$. However, while the auxiliary voltage generation circuitry 14' still receives the second voltage $Vdd_2$ as input, and uses $Vdd_2$ to regulate $Vcc_2$, L2 of the auxiliary voltage generation circuitry 14' references an independent reference voltage $Vdd_3$ instead.

In one embodiment, $Vdd_1$ and $Vdd_3$ are both 5.0 volts. $Vcc_1$ and $Vcc_2$ are 3.3 volts and 5.1 volts respectively. $Vdd_2$ is 12 volts and $Vcc_2$ is regulated to a precision of plus or minus 2%.

Similar to the above described embodiment, the key elements of the primary voltage generation circuitry 12' still include a switching field effect transistor (FET) Q1, an inductor winding L1, a capacitor C1, and a diode D1, coupled to each other as shown. These key circuit elements cooperate with each in the same manner as described earlier. The primary voltage generation circuitry 12' is also intended to represent a broad category of circuitry found in traditional single output DC-DC converters, including but not limited to the DC-DC converter disclosed in the above identified copending US Patent Application.

However, the primary voltage generation circuitry 12' further comprises loading circuitry 20 for removing the requirement of having a minimum load at $Vcc_1$. In other words, the load at $Vcc_1$ can go to zero. The key elements of the loading circuitry 20 comprise a FET Q3, a capacitor C5, resistors R6 and R7, a diode D3, and preferably a ferrite bead FB1, coupled to each other as shown. The loading circuitry 20 is coupled to the rest of the primary voltage generation circuitry 12' at node 18.

When Q1 turns off, Q3 will turn on, thereby clamping the source of Q1 to ground. The output pulses on L2 are maintained, as well as sufficient voltage at the drain of Q2 of the auxiliary voltage generation circuitry is maintained. R6 and C5 cooperate to delay the turning on of Q3 until Q1 is fully turned off. D3 is used to turn off Q3 fast, so that it is off before Q1 turns on. R7 limits the current through Q3 to simulate the minimum load. FB1 is preferably provided to choke out RF.

Similar to the above described embodiment, the auxiliary voltage generation circuitry 14' comprises an inductor winding L2, a series pass FET Q2, and a precision reference U1. Additionally, the auxiliary voltage generation circuitry 14' comprises a diode D2, capacitors C2–C4, and resistors R1–R5. The circuit elements are coupled to each other as shown, and cooperate with each other in similar manner as described above, except for the fact that L2 is referenced to the independent input voltage $Vdd_3$, and the current at L2 is decoupled from L1.

Now, without Q3, when Q2 turns off at low current on L1, the current in L1 would become discontinuous (i.e. go to zero), and the voltage at the source of Q2 will go to $Vcc_1$, rather than the clamped voltage of D1. When this happens, the output voltage of L2 will drop to a low value and Q2 will lose regulation. In other words, $Vcc_2$ will not be in the required regulated band, and an IC component coupled to $Vcc_2$ will become inoperative. However, with Q3, Q2 will not lose regulation, thereby ensuring that $Vcc_2$ will be in the required regulated band, and the receiving IC component will be operative.

As a result of the decoupling, output ripple of $Vcc_1$ is reduced as compared to the above described embodiment, where L2 is referened to $Vcc_1$. Furthermore, under this embodiment, the phases of L1 and L2 may be either in-phase or out-of-phase.

Figure 3:
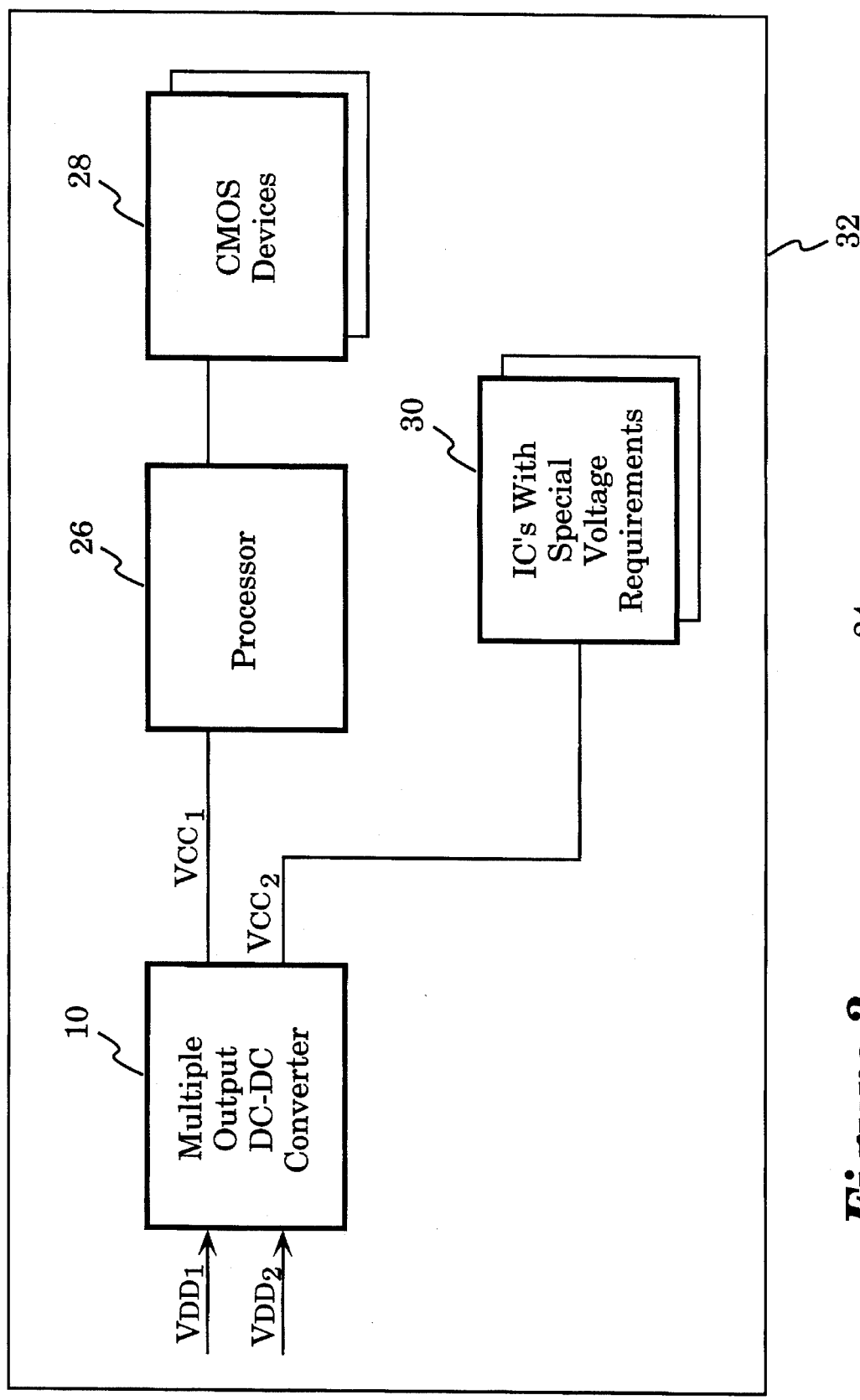
FIG. 3 illustrates one exemplary application of the multiple output DC-DC converter of the present invention.

Referring now to FIG. 3, a block diagram illustrating an exemplary application of the multiple output DC-DC converter of the present invention is shown. As illustrated, the multiple output DC-DC converter 10 is coupled to provide its primary voltage output to a processor 26 and standard CMOS devices 28 of a computer system 24. Additionally, the multiple output DC-DC converter 10 is coupled to provide its auxiliary voltage output to IC components 30 with special voltage requirements. In the illustrated embodiment, the multiple DC-DC converter 10, the processor 26, the CMOS devices 28, and the ICs 30 are disposed on a circuit board 32, known as a mother board in the art. The circuit board 32 includes a socket (hidden by the processor 26) for receiving the processor 26. The CMOS devices 28 and the ICs 30 may be surface mounted to the circuit board 32 in a variety of well known surface mount techniques.

While the present invention has been described in terms of the illustrated embodiments, those skilled in the art will recognize that the invention is not limited to the embodiments described. The method and apparatus of the present invention can be practiced with modification and alteration within the spirit and scope of the following claims. The description is thus to be regarded as illustrative instead of restrictive on the present invention.

What is claimed is:

1. An improved multiple output DC-DC converter having first and second voltage generation circuitry for receiving a first voltage input and generating a first and a second voltage output respectively, wherein the first voltage generation circuitry includes a first switching element and a first inductor element coupled to each other, and the second voltage generation circuitry includes a second inductor element, the first and second inductor elements being complementary to each other, the improvement comprising:

the second voltage generation circuitry further including a regulation circuit coupled to the second inductor element, having a second switching element and a precision reference element coupled to each other, for receiving a second input voltage and regulating the second voltage output to a precise assurance range, the first and second voltage generation circuitry being not directly coupled to each other, except for the first and second inductor elements being complementary to each other, and the second inductor element references a third input voltage independent of the first input voltage.

2. The improved multiple output DC-DC converter as set forth in claim 1, wherein the improvement further includes a loading circuitry, having a third switching element complementary to the first switching element, for allowing no minimum load being maintained on the first voltage output.

3. A multiple output DC-DC converter comprising:

(a) primary voltage generation circuitry, including a first switching element and a first inductor element, for receiving a first input voltage and generating a primary voltage output; and (b) auxiliary voltage generation circuitry, including a second inductor element complementary to the first inductor element, cooperating with the primary voltage generation circuitry for generating an auxiliary voltage output, the auxiliary voltage generation circuitry further having regulation circuitry coupled to the second inductor element, having a second switching element and a precision reference element coupled to each other, for receiving a second voltage input and regulating the auxiliary voltage output to a precise assurance range, the primary and auxiliary voltage generation circuitry being not directly coupled to each other, except for the first and second inductor elements being complementary to each other, and the second inductor element references a third input voltage independent of the first input voltage.

4. The multiple output DC-DC converter as set forth in claim 3, wherein the primary voltage generation circuitry further includes a loading circuitry, having a third switching element complementary to the first switching element, for allowing no minimum load being maintained on the primary voltage output.

5. A circuit board comprising:

a multiple output DC-DC converter having first voltage generation circuitry including a first switching element and a first inductor element for receiving a first voltage input and generating a first voltage output, and second voltage generation circuitry including a second inductor element cooperating with the first inductor element for generating a second voltage output, the second voltage generation circuitry further including regulation circuitry coupled to the second inductor element, having a second switching element and a precision reference element, for receiving a second input voltage and regulating the second voltage output to a precise assurance range, the first and second voltage generation circuitry being not directly coupled to each other, except for the first and second inductor elements being complementary to each other, and the second inductor element references a third input voltage independent of the first input voltage, the first voltage output being provided to a processor, and the second voltage output being provided to a integrated circuit component.

6. A computer system comprising:

a multiple output DC-DC converter having first voltage generation circuitry including a first switching element and a first inductor for receiving a first voltage input and generating a first voltage output, and second voltage generation circuitry including a second inductor element cooperating with the first inductor element for generating a second voltage output, the second voltage generation circuitry further including regulation circuitry coupled to the second inductor element, having a second switching element and a precision reference element, for receiving a second input voltage and regulating the second voltage output to a precise assurance range, the first and second voltage generation circuitry being not directly coupled to each other, except for the first and second inductor elements being complementary to each other, and the second inductor element references a third input voltage independent of the first input voltage;

a processor coupled to said multiple output DC-DC converter for receiving the first voltage output; and an integrated circuit component coupled to said multiple output DC-DC converter for receiving the second voltage output.

7. A digital system comprising:

a multiple output DC-DC converter having first voltage generation circuitry including a first switching element and a first inductor for receiving a first voltage input and generating a first voltage output, and second voltage generation circuitry including a second inductor element cooperating with the first inductor element for generating a second voltage output, the second voltage generation circuitry further including regulation circuitry coupled to the second inductor element, having a second switching element and a precision reference element, for receiving a second input voltage and regulating the second voltage output to a precise assurance range, the first and second voltage generation circuitry being not directly coupled to each other, except for the first and second inductor elements being complementary to each other, and the second inductor element references a third input voltage independent of the first input voltage;

a first integrated circuit component coupled to said multiple output DC-DC converter for receiving the first voltage output; and a second integrated circuit component coupled to said multiple output DC-DC converter for receiving the second voltage output.

* * * * *